United States Patent [19]
Brinker et al.

[11] 3,864,555
[45] Feb. 4, 1975

[54] BEARING DISPLAY DEVICE FOR A PLURALITY OF TARGETS

[75] Inventors: Francis R. Brinker; Eugene R. Roeschlfin; David L. Zeph, all of Indianapolis, Ind.

[73] Assignee: The United States of America as represented by the Secretary of the Navy, Washington, D.C.

[22] Filed: Nov. 27, 1973

[21] Appl. No.: 419,311

[52] U.S. Cl....... 235/150.2, 235/150.27, 343/112 C
[51] Int. Cl............................................ G06f 15/50
[58] Field of Search....... 235/150.2, 150.26, 150.27; 35/10.2; 340/24; 73/178 R; 346/8; 343/112 R, 112 C, 112 PT, 107

[56] References Cited
UNITED STATES PATENTS

| | | | |
|---|---|---|---|
| 3,160,851 | 12/1964 | Ramsayer et al. | 340/24 |
| 3,400,364 | 9/1968 | Musgrave et al. | 340/24 |
| 3,500,413 | 3/1970 | Dohogne et al. | 340/24 X |
| 3,505,640 | 4/1970 | Cohen | 235/150.27 X |
| 3,555,505 | 1/1971 | Srogi | 340/24 |

*Primary Examiner*—Joseph F. Ruggiero
*Attorney, Agent, or Firm*—R. S. Sciascia; Paul S. Collignon

[57] ABSTRACT

A display device showing true and relative positions of a plurality of targets relative to a craft. A circular array of lights are provided on a stationary housing and a dial is rotatably attached to the housing and shows direction of travel of a craft. A computer directs certain lights to be energized to represent targets in the surrounding area. A circuit is provided for keeping constant current through the lights that are energized when different number of lights are energized. The computer continually updates the selection of lights that are to be energized.

5 Claims, 3 Drawing Figures

3,864,555

3,864,555

BEARING DISPLAY DEVICE FOR A PLURALITY OF TARGETS

BACKGROUND OF THE INVENTION

The present invention relates to a bearing situation display, and more particularly to a bearing display device for use with a plurality of targets.

Bearing situation displays heretofore available for shipboard use normally have an inner movable dial having engraved thereon the outline of a boat, as well as degree markings relative to the boat hull. Zero degrees is dead ahead and one hundred eighty degrees is dead astern. The inner dial is rotated by a synchro motor electrically connected with the ship's gyro system. A second movable dial having a pointer engraved thereon is provided to show the position of a target. Rotation of the second dial is controlled by the ship's sonar system. A fixed outer dial is provided with degree markings and the first movable dial and the fixed outer dial are used to determine the ship's bearing and the two movable dials are used to determine relative target bearing. This form of bearing display has, however, one serious limitation in that only one target can be displayed at a time. In battle conditions, a plurality of targets are normally present and it is desirable to display the positions of more than one target at a time.

SUMMARY OF THE INVENTION

The present invention provides a bearing display device capable of showing the bearings of a plurality of targets relative to a ship. A movable dial is provided and is controlled by a ship's gyro system, and a circular array of lights is provided on a stationary housing and surrounds the movable dial. A computer, which is connected with the ship's sonar system, directs certain lights to be energized which represent targets. A circuit is provided for keeping constant current through the lights that are energized when different number of lights are energized.

It is therefore a general object of the present invention to provide a bearing situation display capable of designating a plurality of targets.

Other objects, advantages and novel features of the present invention will become apparent from the following detailed description when considered in conjunction with the accompanying drawings.

DESCRIPTION OF THE PREFERRED EMBODIMENT

Figure 1:
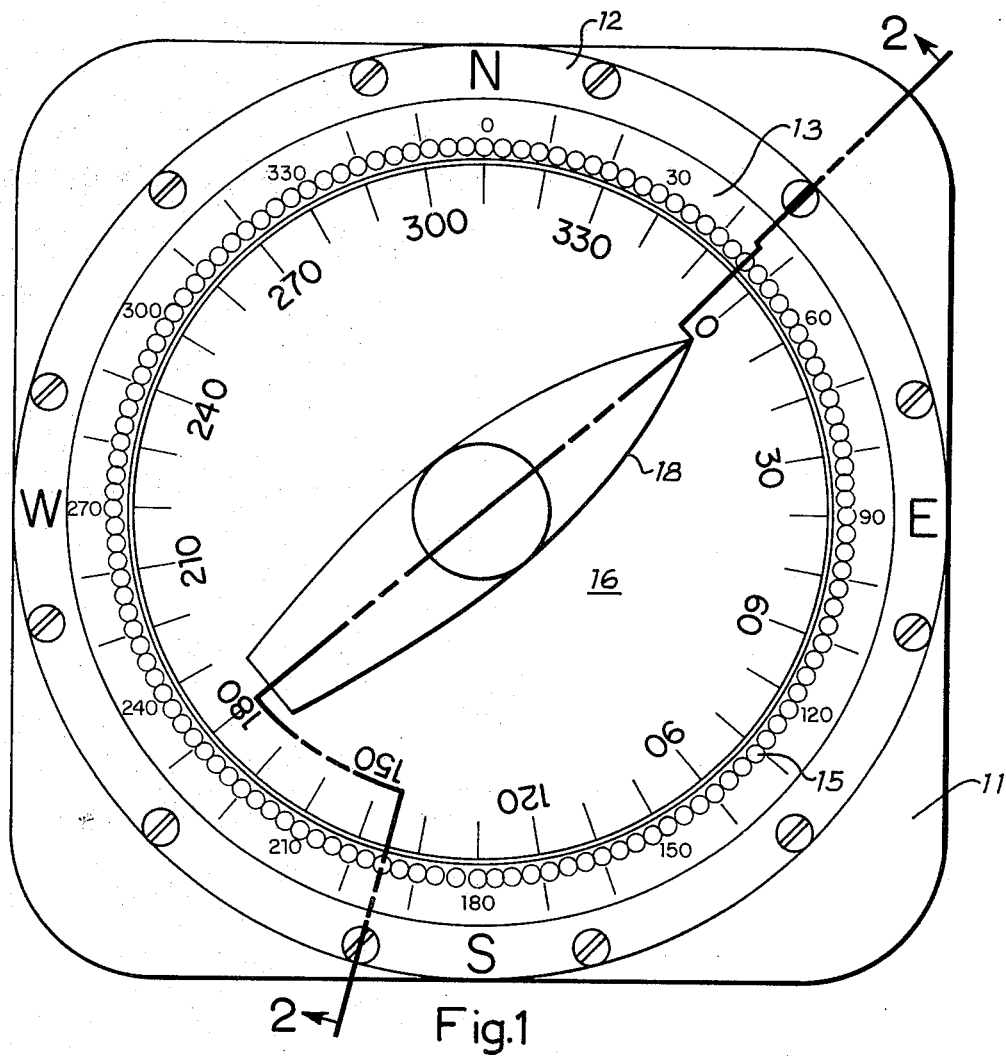
FIG. 1 is a top plan view of a target bearing display in accordance with a preferred embodiment of the present invention.

Referring now to the drawings, a housing 11 is adaptable for stationary mounting in a ship and compass directions N, S, E, and W are engraved on annular ring 12 attached to the top face of housing 11, as shown in FIG. 1 of the drawing. An annular plate 13 is attached to housing 11 by means of screws 14 and a plurality of light emitting diodes 15 are attached to plate 13 to provide a circular array of lights. Plate 13 is engraved with lines and numbers which represent compass headings. Light emitting diodes 15 have a coaxial case with the outer shell of the case being the anode and a center lead being the cathode. The outer shells of diodes 15 are conductively epoxied to annular plate 13, which is electrically isolated and thus all the anodes are tied in common. By way of example, 128 diodes are equally spaced around the circumference of annular plate 15 thereby placing a diode 15 every 2.8125 degrees.

Figure 2:
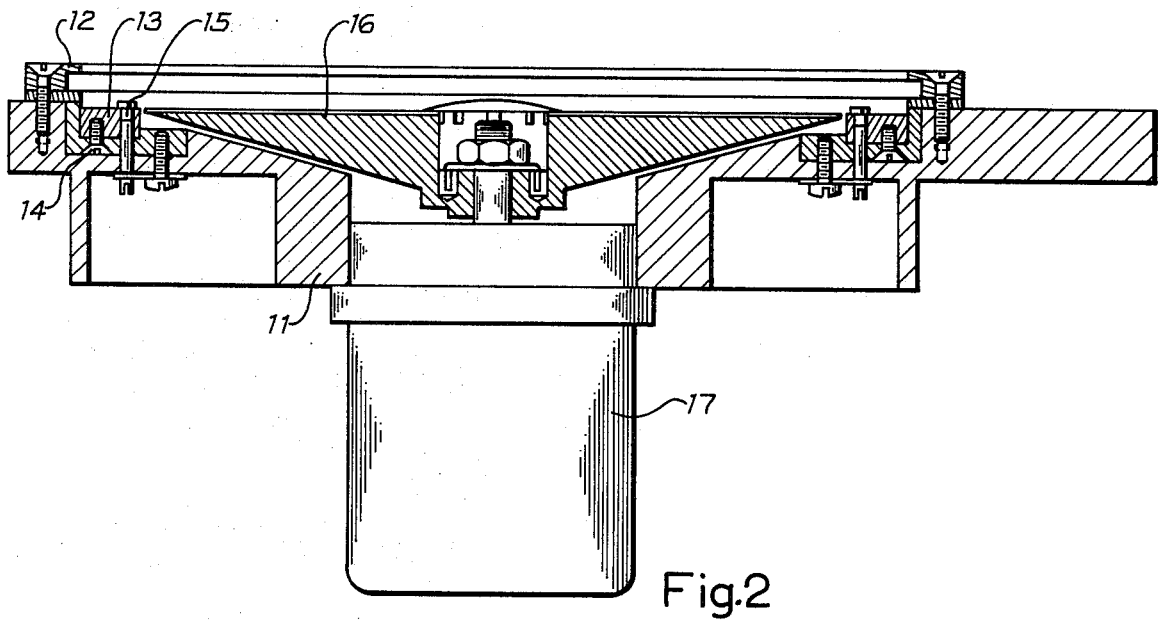
FIG. 2 is a sectional view taken on line 2—2 of FIG. 1.

As best shown in FIG. 2 of the drawings, a dial 16 is rotatably mounted relative to housing 11, and dial 16 is positioned by synchro motor 17 which receives signals from the ship's gyro system. Lines and numbers are engraved on dial 16 to represent compass headings and, in addition, the outline of a ship 18 is engraved on dial 16 with a dead ahead position being zero degrees and one hundred eighty degrees being dead astern.

Figure 3:
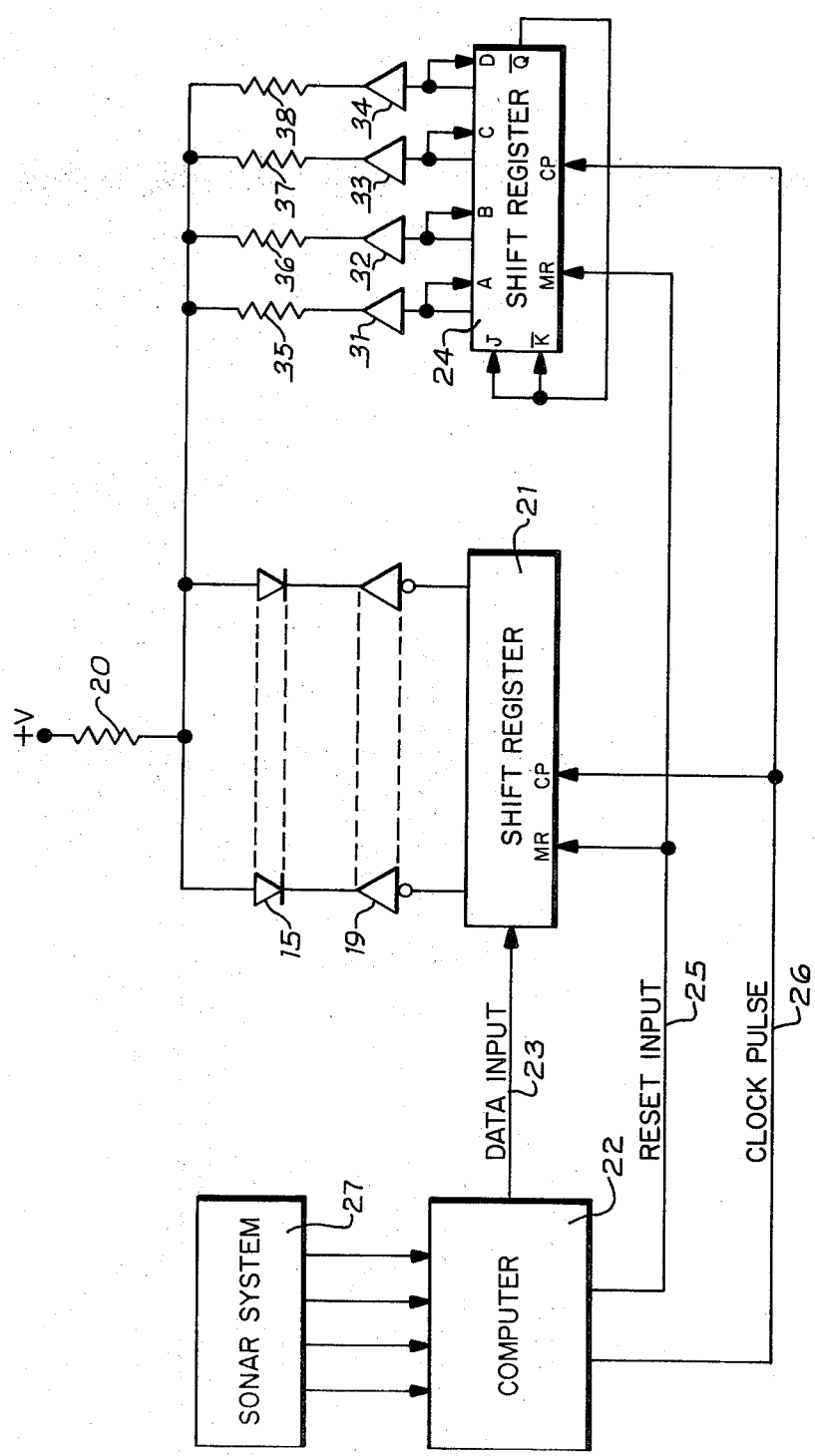
FIG. 3 is a block diagram showing the electrical connection of a preferred embodiment of the present invention.

Referring now to FIG. 3 of the drawings, the 128 light emitting diodes 15 each has its cathode connected to its own current driver 19, and each current driver 19 is connected to a tap on a 128-bit shift register 21. Current limiting for diodes 15 is provided by anode resistor 20 which is connected to a source of voltage. The 128-bit word required for updating the target display is received by register 21 from a shift register within computer 22, via the data input line 23. Computer 22 also provides a reset input and a clock pulse to shift register 21 and shift register 24, via input lines 25 and 26, respectively. By way of example, computer 22 might be a Nova 800 series computer manufactured by Data General Corporation, Southboro, Mass.

The Nova 800 series computer is a general purpose computer system with a 16-bit word length which is organized around four accumulators, two of which can be used as index registers. A central processor in the computer is the control unit for the entire system and governs all peripheral in-out equipment, performs all arithmetic, logical and data handling operations, and also sequences the program. The central processor is connected to the memory by a memory bus and to the peripheral equipment by an in-out bus. The processor handles words of 16 bits, which are stored in a memory with a maximum capacity of 32,768 words. The bits of a word are numbered 0 to 15, left to right, as are the bits in the registers that handle the words. Registers that hold addresses are 15 bits, numbered according to the position of the address in a word, i.e., 1 to 15. Words are used either as computer instructions in a program, that is, software routines, as addresses, or as operands, that is, data for the program. The program can interpret an operand as a logical word, an address, a pair of 8-bit bytes, or a 16-digit signed or unsigned binary number.

The processor performs a program by executing instructions retrieved from consecutive memory locations as counted by the 15-bit program counter. At the end of each instruction, the program counter is incremented by one so that the next instruction is normally taken from the next consecutive location. The other internal registers of importance to the programmer are four 16-bit accumulators. Data can be moved in either direction between any memory location and any accumulator. One accumulator can be used for in-out data transmission without disturbing others being used continually for computations. Complex software routines, such as multiplication, division and floating point can be performed without constantly referencing memory.

On the processor console is a set of data switches which an operator can supply words and addresses to the program. The console also has a number of control switches that allow the operator to start and stop the program, to deposit the contents of the data switches in any memory location or accumulator, and to display the contents of any location or accumulator in the data lights. Additional information concerning the Nova 800 series computer can be found in the text entitled, "How To Use The Nova Computers," published in 1970 by the Data General Corporation. Shift register 24 counts the number of diodes 15 illuminated and, via current drivers 31, 32, 33, and 34 and resistors 35, 36, 37, and 38, functions to keep the sum of the current through resistors 35, 36, 37, and 38 a constant value so as to avoid variations in diode current when less than the maximum number of diodes are illuminated. Thus shift register 24 prevents variations in light intensity and danger of damage to diodes 15. Also, in order to prevent damage to diodes 15, when the target display is updated both shift registers 21 and 24 are initialized to the all zero state via reset input 25, from computer 22, prior to the start of data transmission. When shift register 21 is reset to all zeros, the outputs of each of the 128 inverting current drivers 19 will be a logic 1 (positive logic), and no illumination current will flow through any of the diodes 15. Likewise, when shift register 24 is reset to all zeros, the outputs of the non-inverting current drivers 31, 32, 33, and 34 will be zero, causing current flow in resistors 34, 36, 37, and 38 equal, in each resistor, to the current flow through one diode.

OPERATION

The embodiment of the present invention which is shown in the drawings is designed to display up to four targets simultaneously, however, it should be understood that a greater or lesser number of targets could also be selected without departing from the spirit of the invention. The ship's sonar system 27 which is operated by a sonar operator provides information to computer 22 relating to which light emitting diodes should be illuminated to indicate the presence of one or more targets. By way of example, the sonar operator selects targets which are to be displayed and this selection is sent to computer 22 in the form of binary target bearing words. Data to update the display is stored in computer 22 in the form of eight 16-bit words formed by a short software routine within the Nova 800 series computer from the binary target bearing words. Each of these words is outputted to a shift register within computer 22, and then shifted 16 times causing the data to be transferred to shift register 21. When "zeros" (absence of target) are transmitted to shift register 21, shift register 24 accepts data through parallel inputs A, B, C, and D, by the parallel enable input. Since each parallel input is connected to its respective output, the operation becomes a holding mode. When a " one" is transmitted to shift register 21, shift register 24 operates in a serial mode and accepts data via its J, $\overline{K}$ inputs from the $\overline{Q}$ output. Since shift register 24 has been initialized to the all zero state, $\overline{Q}$ will be a logic "one" and, consequently, logic ones will be shifted into shift register 24, thereby stopping current flow in successive resistors 35, 36, 37, and 38, as diodes 15 are illuminated, up to four diodes. Each data bit on line 23 is accompanied by a clock pulse on line 26, which causes data to be loaded into shift registers 21 and 24.

Dial 16 is positioned by synchro motor 17 from signals received from the ship's gyro system and the outline of a ship 18 on dial 16 and the degree markings on annular plate 13 provides the ship's true bearing. The light emitting diodes 15 that are energized show positions of targets relative to the ship.

Obviously many modifications and variations of the present invention are possible in the light of the above teachings. It is therefore to be understood that within the scope of the appended claims the invention may be practiced otherwise than as specifically described.

We claim:
1. A device for displaying positions of a plurality of targets detected by a sonar system relative to a craft comprising,
   a stationary housing,
   a dial rotatably attached to said stationary housing for indicating direction of travel of a craft,
   a plurality of lighting elements positioned around a circumference on said stationary housing for indicating positions of targets,
   means for individually energizing said lighting elements,
   computing means for periodically updating the selection of said lighting elements to be energized, and
   means for keeping a constant current flow through each said lighting element that is energized when different numbers of lighting elements are energized.

2. A device for displaying positions of a plurality of targets relative to a craft as set forth in claim 1 wherein said dial is rotatable by a synchro motor electrically connected with a craft's gyro system thereby indicating true bearing of said craft.

3. A device for displaying positions of a plurality of targets relative to a craft as set forth in claim 1 wherein said lighting elements are light emitting diodes.

4. A device for displaying positions of a plurality of targets relative to a craft as set forth in claim 1 wherein said means for keeping a constant current flow through each said lighting element comprises a plurality of resistive elements equal in number to the number of lighting elements to be energized and switching means for stopping current flow through one resistive element for each lighting element energized.

5. A device for displaying positions of a plurality of targets relative to a craft as set forth in claim 3 wherein said means for energizing said light emitting diodes comprises a source of voltage connected to said light emitting diodes and a plurality of current drivers equal in number to the number of said light emitting diodes, said current driver being connected in series one each with each said light emitting diode.

* * * * *